July 18, 1950     D. G. SMITH ET AL     2,515,740

STITCH-FORMING MECHANISM FOR SEWING MACHINES

Filed Nov. 14, 1947     6 Sheets-Sheet 1

Inventors
Darwin G. Smith and
Harold C. Faulkner
By William P. Stewart
Attorney

Witness: Godfrey Piccini

July 18, 1950     D. G. SMITH ET AL     2,515,740
STITCH-FORMING MECHANISM FOR SEWING MACHINES
Filed Nov. 14, 1947     6 Sheets-Sheet 2

Inventors
Darwin G. Smith and
Harold C. Faulkner
By William P. Stewart
Attorney

Witness:
Godfrey Pecina

July 18, 1950 D. G. SMITH ET AL 2,515,740
STITCH-FORMING MECHANISM FOR SEWING MACHINES
Filed Nov. 14, 1947 6 Sheets-Sheet 3

Inventors
Darwin G. Smith and
Harold C. Faulkner
By
William P. Stewart
Attorney

Witness:
Godfrey Pecina

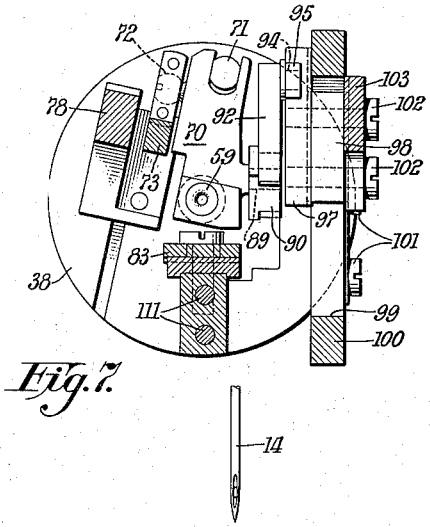
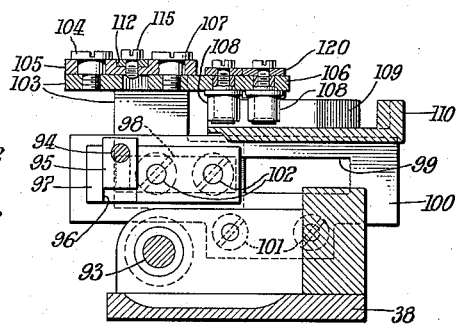
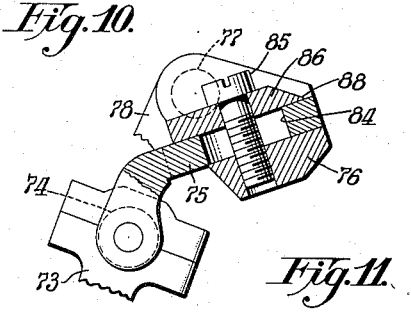
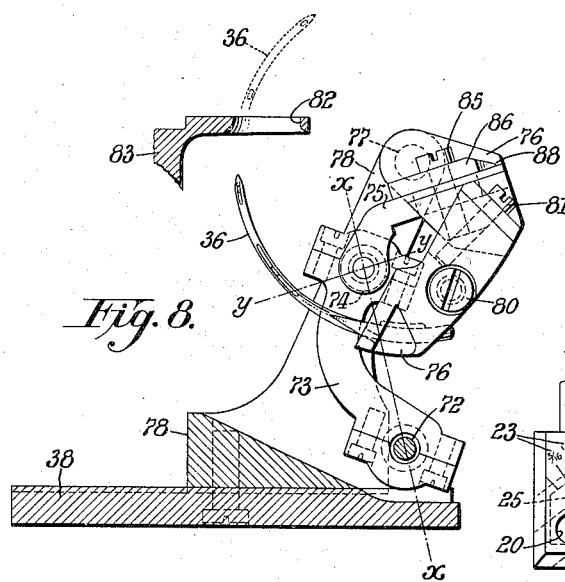
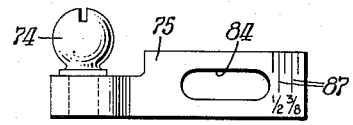
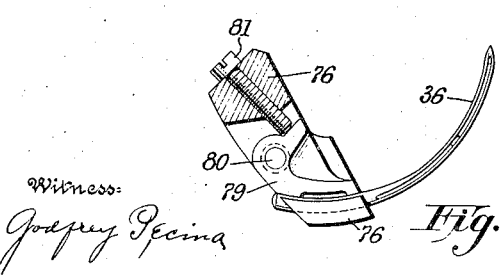
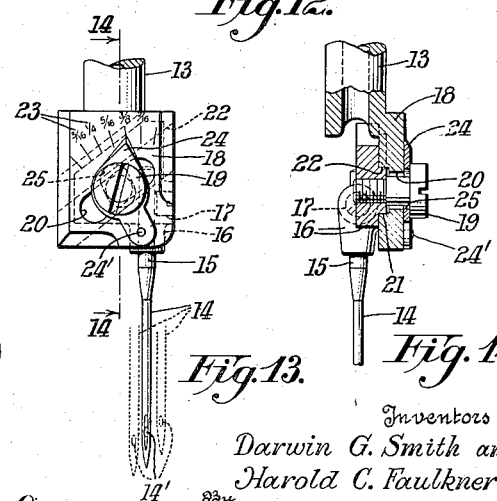

July 18, 1950  D. G. SMITH ET AL  2,515,740
STITCH-FORMING MECHANISM FOR SEWING MACHINES
Filed Nov. 14, 1947  6 Sheets-Sheet 5
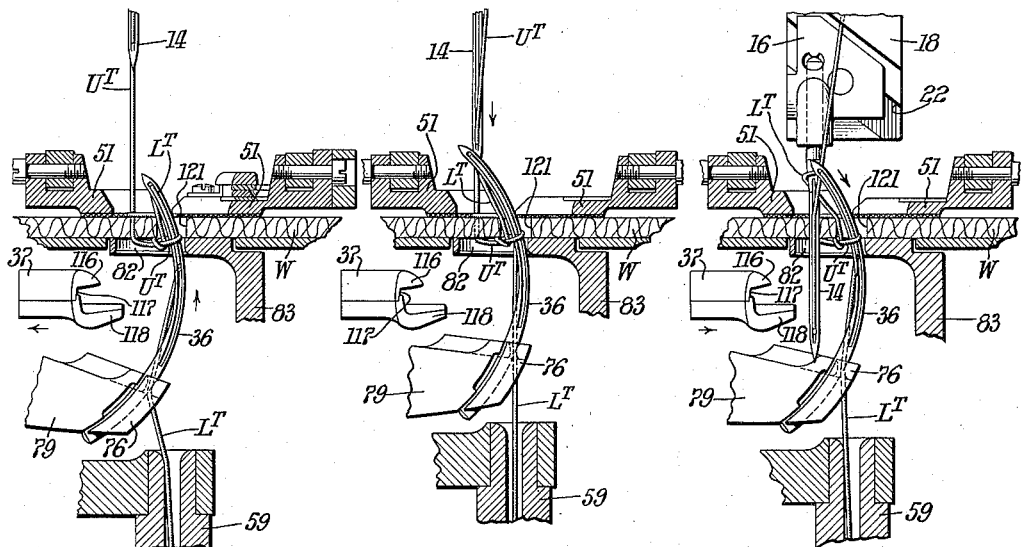
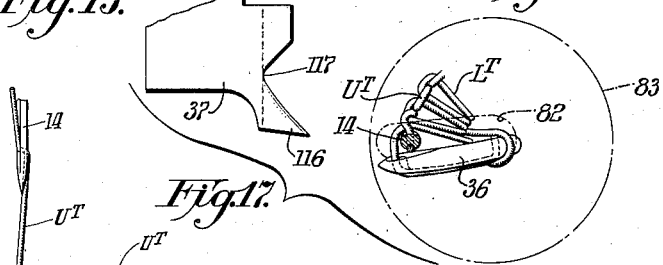
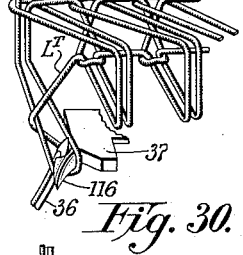
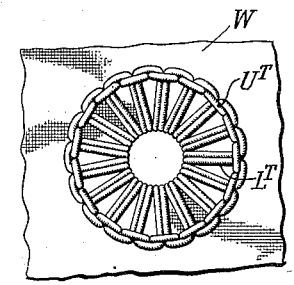
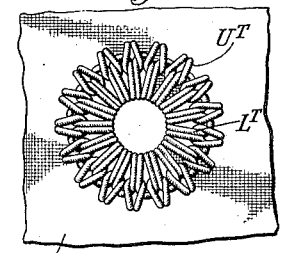
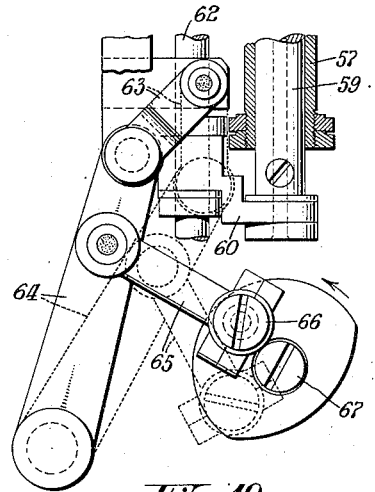
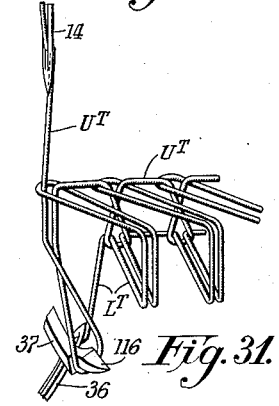
Inventors
Darwin G. Smith and
Harold C. Faulkner
By William P. Stewart
Attorney July 18, 1950 D. G. SMITH ET AL 2,515,740
STITCH-FORMING MECHANISM FOR SEWING MACHINES
Filed Nov. 14, 1947 6 Sheets-Sheet 6
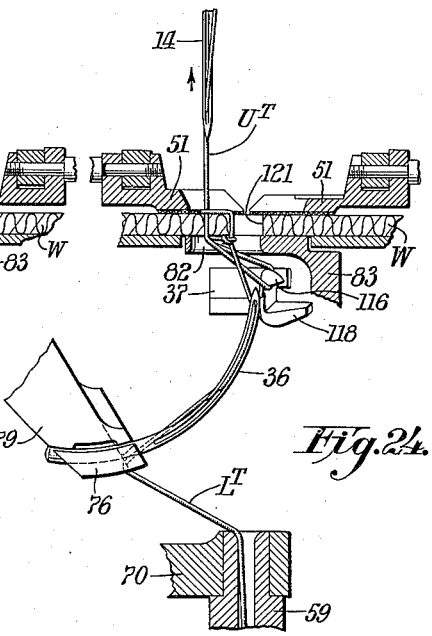
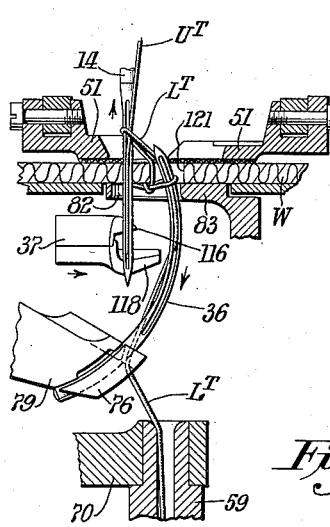
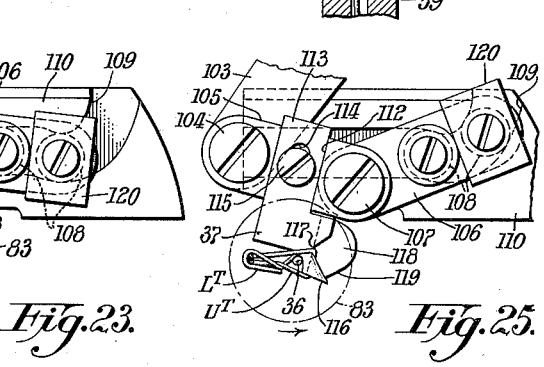
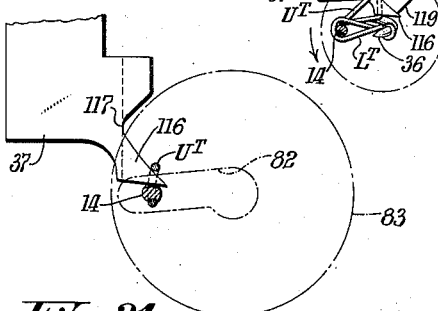
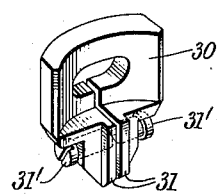
Inventors
Darwin G. Smith and
Harold C. Faulkner
By William P. Stewart
Attorney
Witness:
Godfrey Pecina Patented July 18, 1950

2,515,740

UNITED STATES PATENT OFFICE 2,515,740

STITCH-FORMING MECHANISM FOR SEWING MACHINES

Darwin G. Smith and Harold C. Faulkner, Bridgeport, Conn., assignors to The Singer Manufacturing Company, Elizabeth, N. J., a corporation of New Jersey Application November 14, 1947, Serial No. 786,017

14 Claims. (Cl. 112—66)

This invention relates primarily to an improvement in overseaming stitch-forming mechanism and more particularly of that class embodied in eyelet stitching machines in which the stitch-forming elements are mounted upon rotary supports disposed respectively above and below the work and provided with means for turning them in the stitching of the eyelet.

In the art of stitched articles, the greater percentage of sewn eyelets range in outside diameter from 1/8" to 1/2", with the usual cut eye having substantially the same range as to size so as to give the desired effect in size of the finished eyelet.

It is the object of the present invention to provide an eyelet sewing machine having an improved stitch-forming mechanism capable of producing eyelets within the range of sizes indicated above and requiring a minimum of simple machine adjustments in producing this range of eyelets.

Another object of the present invention is to provide a simplified stitch-forming mechanism composed of sturdier components with good mechanical movements, the present construction being in the nature of an improvement over the construction disclosed in the U. S. Patent of E. B. Allen, No. 1,162,207, dated Nov. 30, 1915.

With the above and other objects in view, as will hereinafter appear, the invention comprises the devices, combinations and arrangements of parts hereinafter set forth and illustrated in the accompanying drawings of a preferred embodiment of the invention, from which the several features of the invention and the advantages attained thereby will be readily understood by those skilled in the art.

In the accompanying drawings:

Fig. 7 represents a horizontal sectional view taken substantially along the line 7—7, Fig. 5.

Fig. 8 is a vertical section taken through the turret, showing, in full lines, the curved needle at the lower end of its stroke and, in dotted lines, at the upper end of its stroke.

Fig. 9 is a side elevation, partly in section, of the curved needle clamp.

Fig. 10 represents a vertical sectional view taken substantially along the line 10—10, Fig. 4.

Fig. 11 is an enlarged vertical sectional view taken substantially along the line 11—11, Fig. 4, showing the means by which the stroke of the curved needle is adjusted.

Fig. 12 is a top plan view of the slotted element in Fig. 11, showing the graduations which facilitate the proper adjustment of the stroke of the curved needle.

Fig. 13 is an enlarged right side elevational view of the straight needle holder, showing, in dotted lines, the extreme positions of lateral adjustment of the needle.

Fig. 14 is a sectional view taken substantially along the line 14—14, Fig. 13.

Fig. 15 is a vertical sectional view at the stitching point, showing the curved needle advancing to present its thread for entrance by the descending straight needle.

Fig. 16 is a view similar to Fig. 15 with the curved needle just beginning its return motion after having presented its thread to the straight needle.

Fig. 17 is an enlarged top plan view, with the needle in section, of certain of the parts positioned as shown in Fig. 16.

Fig. 18 is a view similar to Fig. 15, but with the curved needle thread-loop entered by the straight needle which has penetrated the fabric and reached the bottom of its stroke.

Fig. 19 is a view of the curved needle actuating connections, showing, in full lines, the position of the parts when the curved needle is at the bottom of its dip at the upper end of its stroke and, in dotted lines, the position of the parts shortly after the curved needle has begun its return stroke.

Fig. 20 is a sectional view, showing the parts in the next position of stitch-formation with the looper seizing the straight needle thread-loop and the curved needle descending through the cut eye in the fabric.

Fig. 21 is a top plan view, with the needle in section, of certain of the parts as positioned as shown in Fig. 20, illustrating the looper seizing the straight needle thread-loop.

Fig. 22 is a view similar to Fig. 20, but with the looper moving forwardly and laterally to avoid striking the descending curved needle.

Fig. 23 is a top plan view, with the needle in section, of certain of the parts positioned as shown in Fig. 22.

Fig. 24 is a sectional view, showing the parts in the next position with the looper at the end of its loop-seizing stroke and with the straight needle thread-loop expanded and held over the point of the curved needle for entrance thereby.

Fig. 25 is a top plan view of the looper and its carrier in the position conforming to that shown in Fig. 24.

Fig. 26 is an elevational view of the curved needle actuating mechanism, showing the position of the parts when the curved needle is at the lower end of its stroke.

Fig. 27 is an enlarged perspective view of the needle-bar guide-piece, showing its widthwise adjustable spline which tracks a groove in the needle-bar.

Figs. 28 and 29 are illustrations of the top and bottom sides, respectively, of the completed eyelet as produced on a machine equipped with the present invention.

Fig. 30 is a development of the stitching as produced by a machine fitted with the present looper mechanism.

Fig. 31 is a view similar to Fig. 30, but illustrating the stitching as produced by prior machines.

Figures 1, 2:
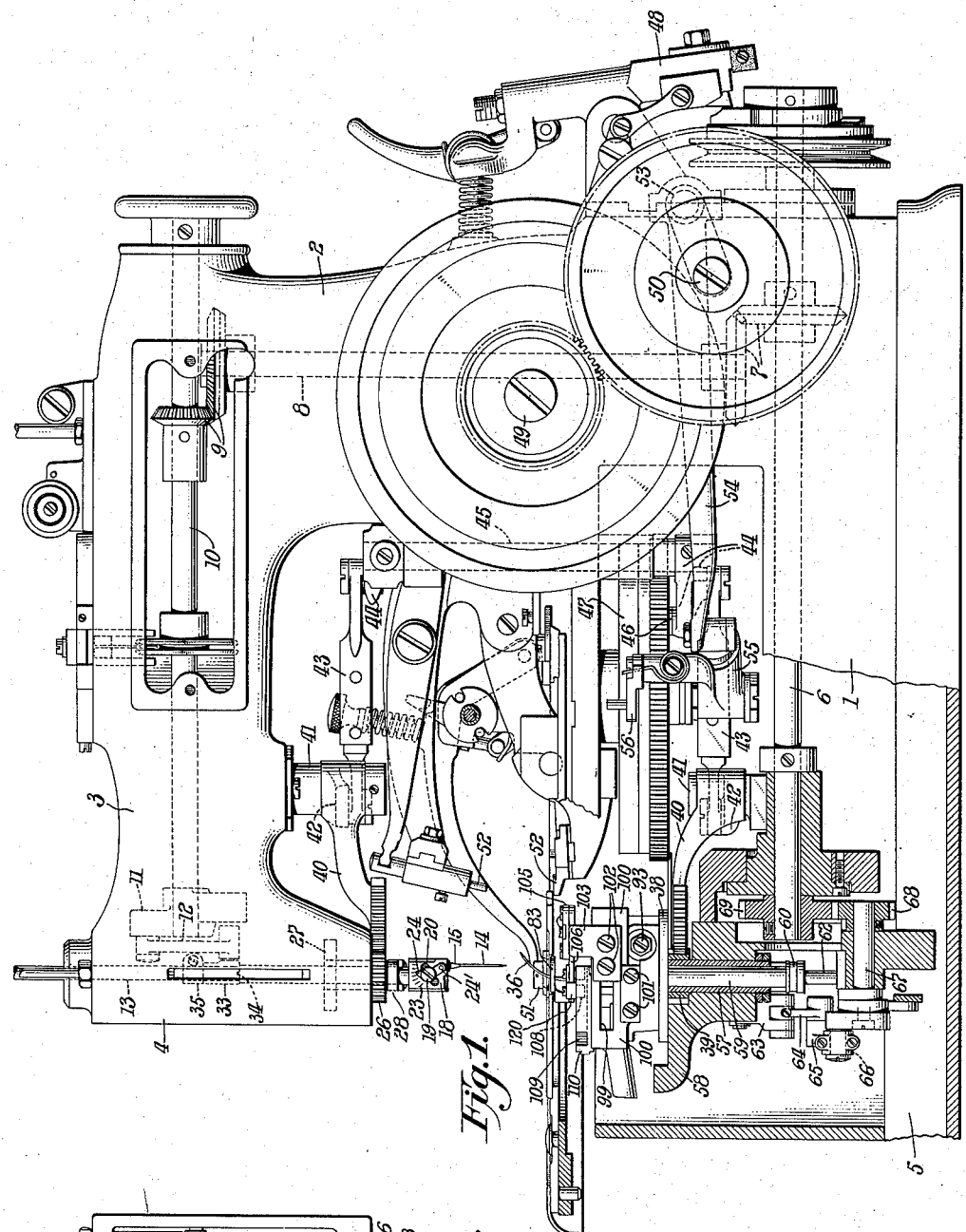
Fig. 1 is a right side elevational view, partly in section, of an eyelet sewing machine embodying the invention.
Fig. 2 is a front elevational view, partly in section, of the sewing machine head with the face plate removed to show the needle-bar actuating connections.

Referring more in detail to the drawings, the present illustrated embodiment of the invention includes a machine frame having a rectangular base 1 from which rises a hollow standard 2 having the tubular overhanging bracket-arm 3 terminating in a head 4. The base 1 is shown resting on a bed-plate 5. Within the base 1 is suitably journaled a main sewing shaft 6, Fig. 1, which, through the one-to-one bevel gears 7 drives a vertical-shaft 8 journaled within the standard 2. The shaft 8 has a one-to-two speed-multiplying bevel-gear driving connection 9 with an upper or needle-bar-reciprocating shaft 10 which is journaled within and lengthwise of the bracket-arm 3. Secured to the front end of the shaft 10 is a crank 11 connected by a link 12 to a vertically reciprocatory needle-bar 13 journaled for endwise movement in the head 4. Carried at the lower end of the needle-bar 13 is the usual straight depth-stitch needle 14 which can be adjusted sidewise or laterally of the needle-bar to effect a change in the size of the outside diameter of the eyelet. To provide for this lateral adjustment, the needle 14 is secured in a two-piece needle-clamp comprising a fixed part and a movable part, the clamp being best shown in Figs. 13 and 14. The shank 15 of the needle 14 is secured in the movable part 16 of the clamp by a set-screw 17. The movable part 16 and the fixed part 18 of the needle-clamp are fastened together by a clamp-screw 19 extending through an elongated clearance opening 20 in the fixed part 18. It will be observed that one face of the movable part 16 is provided with an inclined tongue 21 which fits into a groove 22 formed in the adjacent face of the fixed part 18. By loosening the screw 19 the movable part can be shifted relative to the fixed part along the inclined axis of the groove 22. Thus, when the needle 14 is adjusted in a direction away from the axis of the needle-bar 13 it is raised and when it is adjusted toward the axis of the needle-bar 13 it is lowered. The resultant vertical adjustment of needle properly positions the needle-eye 14' with respect to the beak of the complemental looper, later to be described, thus insuring the formation of a sufficient loop of needle-thread for seizure by the looper for large eyelets as well as for small eyelets. To facilitate accurate shifting of the needle 14 to its proper lateral position, the fixed part 18 of the needle-clamp is provided with graduations 23, Fig. 13, representing the diameter of the finished eyelet and complemental to these graduations is a pointer 24 pivotally mounted on a pin 24' and apertured at 25 to receive the clamp-screw 19. Adjustment of the movable member 16 of the needle-clamp will cause the pointer 24 to pivot on the pin 24' and play over the graduations 23, thus indicating the lateral setting of the needle 14.

In order to disperse the stitches uniformly about the eyelet, the needle-bar 13 is caused to make one complete revolution during each stitching cycle. To that end, the needle-bar 13 has its upper bearing in a bushing 24'', Fig. 2, carried in the upper wall of the head 4, and its lower bearing in a rotary bushing 25', Fig. 3, journaled in the lower wall of the head 4. The rotary bushing 25' is provided beneath the head 4 with a toothed pinion 26 and has threaded thereon above the wall of the head a collar 27 by which the bushing is maintained in position. Beneath the pinion 26, the bushing 25' is formed with a collar 28, Fig. 3, to which is secured, by a screw 29, a guide-piece 30 having a key or spline 31 entering a groove 32 in the side of the needle-bar 13. The spline 31 and groove 32 cooperate to confine the needle-bar 13 from turning relative to the bushing 25 while permitting the needle-bar to reciprocate freely. It will be observed in Fig. 27 that the spline 31 is vertically slotted, dividing the same into two halves which can be relatively widthwise adjusted by the screws 31' so that the spline may be made to accurately fit the groove 32 in the needle-bar 13. As shown in Fig. 2, the link 12 at its lower end is connected to a sleeve 33 confined between a shoulder 34 on the needle-bar 13 and a collar 35 clamped on the needle-bar.

Cooperating with the straight depth-stitch needle 14 is the under stitching mechanism comprising a loop-presenting lower overedge implement or curved needle 36 and a lower looper 37, both mounted on a rotary turret 38 and actuated in a manner later to be described. The turret 38 is provided with a pinion 39, Fig. 1, similar to the pinion 26 on the needle-bar bushing 25, the pinions 26 and 39 meshing with toothed sectors 40 which are preferably mounted on separate but alined fulcra 41. These sectors 40 have lateral arms 42 which are connected by adjustable links 43 to upper and lower cranks 44 on a vertical shaft 45, the lower crank carrying a cam-follower roll 46 entering a suitable cam groove in the under face of the usual feed-cam 47. The mechanism just described slowly turns the stitch-forming instrumentalities about a vertical axis in a counterclockwise direction, when viewing the machine in top plan, during the sewing operation to place the overedge stitches radially of the eyelet. This mechanism is substantially the same as that disclosed in the patents of Allen, No. 1,162,207, above referred to, and No. 1,346,102, of July 13, 1920.

The feed-wheel 47 is given a slow step-by-step movement during the sewing by means of the usual reduction gear connections with the main sewing shaft 6, the period of operation of which is controlled by the regular stop-motion 48, all as disclosed in the above mentioned Allen Patent No. 1,346,102.

Journaled in the machine-frame are two transverse or cross shafts 49 and 50, Fig. 1. Shaft 49 performs a single rotation prior to sewing and carries cams (not shown) which act to close the work-clamp 51 upon the work and to tilt the stop-motion lever 48 into running position. Also operated by shaft 49 is the eyelet cutting device 52, fully described in another patent application filed in the name of H. C. Faulkner. Shaft 50 performs a single rotation after sewing is completed. It is formed with a crank 53 which acts through the link 54 to swing the arm 55 and pawl 56 and impart a rapid motion to the feed-wheel 47 in one sweep of the arm 55, after the sewing is completed, to restore the feed-wheel to its initial position. This rapid motion of the feed-wheel 47 repositions the upper and under stitching devices to their initial sewing positions. These cross shafts 49 and 50, together with their driving and controlling connections are well known; being constructed substantially in accordance with the disclosure in the Allen Patent No. 1,346,102.

As previously mentioned, the lower curved needle 36 and the looper 37 are mounted on the turret 38 which is provided with a depending hollow spindle 57 journaled for turning movement in the turret-bracket fastened to the machine-base 1. Endwise slidable in the bore of the spindle 57 is the usual actuating rod 59 driven in a manner fully disclosed in the Allen Patent No. 1,162,207. Generally speaking, the actuating rod 59, Figs. 1, 3, 19 and 26 at its lower end is embraced by one end of a laterally extending head 60 confined at its other end between collars 61 threaded on a driving rod 62 vertically reciprocable in the turret-bracket 58. The driving rod 62 is reciprocated in its bearings by means of the interconnected toggle-links 63 and 64 which are connected by a link 65 to a crank 66 carried on the outer end of a short looper-actuating shaft 67. The inner end of the looper-actuating shaft 67 has mounted on it a gear 68 meshing with a gear 69 twice its size and fastened on the main sewing shaft 6. Through the connections just described, the crank 66 has imparted to it uniform rotary motion in unison with that of the needle-bar crank 11. The crank 66 imparts to the driving-rod 62, through the toggle links 63, 64, an interrupted reciprocatory motion which, through the mechanism carried by the turret 38, operates the curved needle 36 and looper 37.

Referring now to Figs. 4, 5, 6 and 7, it will be seen that the loop-presenting implement or curved needle 36 and the looper 37 are actuated by connections with a laterally offset head 70 on the upper end of the actuating rod 59. To steady the offset head 70 it is bifurcated at its free end and straddles a guide-rod 71 upstanding from the turret 38. The curved needle 36 is operated from the offset head 70 by means of a ball-stud 72, Fig. 8, connected by a link 73 to a ball-stud 74 carried by a needle-carrier rock-arm 75. The rock-arm 75 is attached to a needle-carrier 76, Figs. 8 and 11, supported for vibration on a pivot-stud 77 journaled in the upper end of a supporting post 78 rising from and adjustably fastened on the turret 38. The curved needle 36 is fastened to the needle-carrier by means of a pivotal clamp-member 79, Fig. 9, fulcrumed on stud 80 and forced into clamping engagement with the shank of the curved needle 36 by a screw 81 threaded into the needle-carrier 76. As the needle-carrier 76 is vibrated about the axis of the pivot-stud 77, the curved needle 36 is reciprocated through one end of a suitable aperture 82 formed in the usual offset needle-throat member 83 adjustably supported on the turret 38; the straight needle reciprocating through the opposite end of the aperture 82 after penetrating the fabric to produce the depth-stitch.

When adjusting the size of the sewing circle or eyelet, as by shifting the needle 14 sidewise of the needle-bar 13, the stroke of the curved needle 36 need not be changed unless there is an excessive amount of lower thread for the size of the eyelet being produced. To provide for regulating the stroke of the curved needle 36, the needle-carrier rock-arm 75, Fig. 11 is slotted, as at 84, to receive a clamping screw 85 passing through a clamp-plate 86 and threaded into the needle-carrier 76. To facilitate adjusting the rock-arm 75 relative to the needle-carrier 76, the rock-arm 75 is provided with graduations 87, Fig. 12, and the clamp-plate 86 is provided with a complemental indicator toe 88. It will be understood that when increasing the size of the eyelet the stroke of the curved needle 36 need be increased only to create sufficient throw of the curved needle so that its eye will travel beyond the path of the straight needle, thereby to present a loop of lower thread in position for the straight needle to enter the loop. Referring to Fig. 8, it will be seen that adjustment of the rock-arm 75 relative to the needle-carrier 76, when the curved needle 36 is at the lower end of its stroke, will result in a shifting of the ball-stud 74 substantially along a line $y-y$ which is preferably normal to the line $x-x$ connecting the two ball-studs 72 and 75. This effects a turning of the link 73 about the axis of the ball-stud 72 without causing any noticeable shifting of the needle-carrier 76 about its pivot-stud 77. Thus, the stroke of the curved needle 36 is changed at its upper end only, while maintaining the necessary fixed relative position of the curved needle at the lower end of the stroke with respect to that of the looper at the end of its needle-thread-loop presenting stroke.

Figure 3:
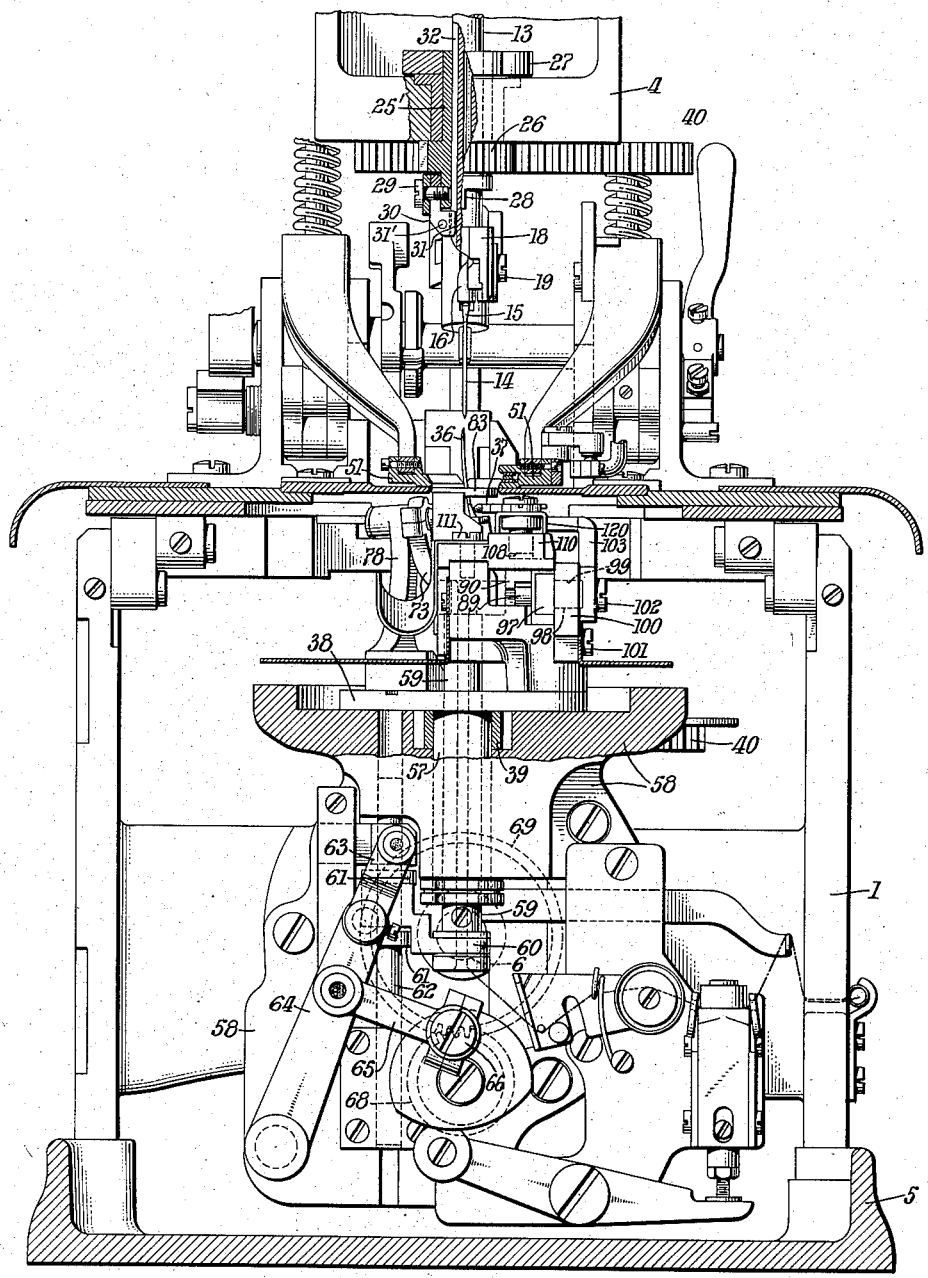
Fig. 3 is a front end elevational view, partly in section, of the sewing machine, showing the driving mechanism for the lower stitch-forming elements.
Figures 4, 5, 6:
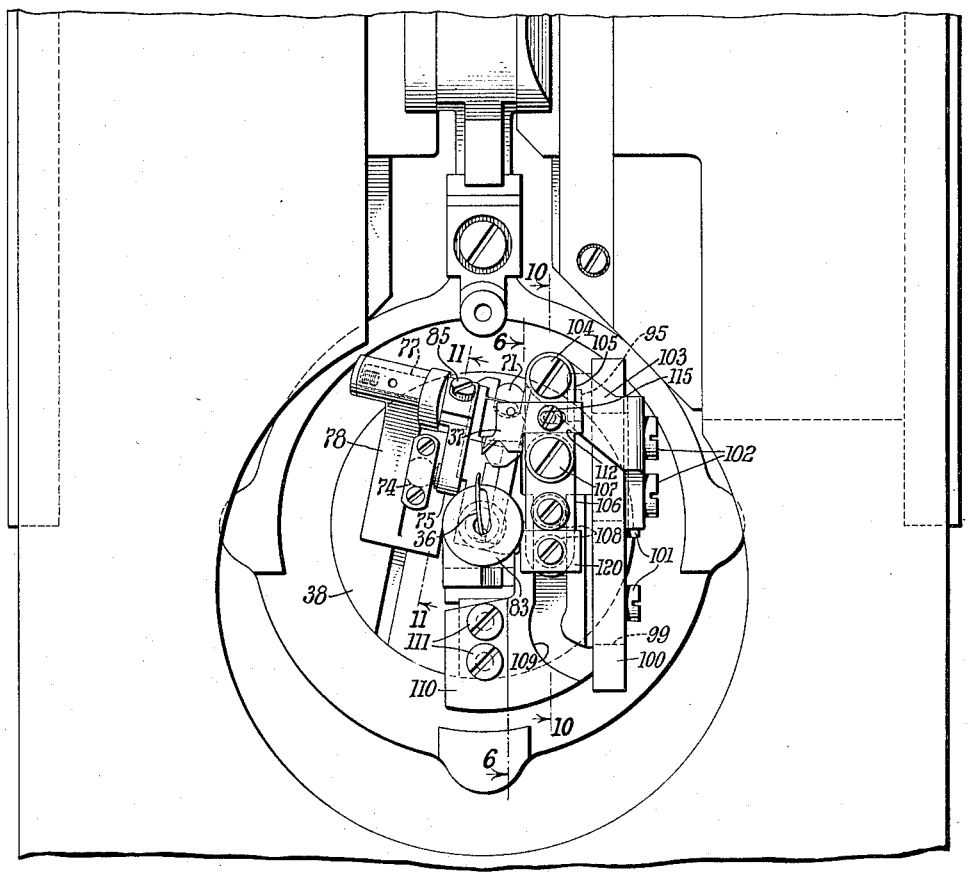
Fig. 4 is a top plan view of the machine-bed with the usual work-clamping means removed to show better the turret and the components of the under stitching mechanism supported by the turret.
Fig. 5 is a rear elevational view, partly in section, of the turret, illustrating the support and drive for the curved needle.
Fig. 6 represents a vertical sectional view taken substantially along the line 6—6, Fig. 4, showing the drive for reciprocating the looper.

The improved looper mechanism, as previously mentioned, derives its movements from the offset head 70 on the reciprocatory actuating-rod 59. To that end, the offset head 70 is provided with a stud 89, Figs. 6 and 7, upon which is pivotally mounted a slide-block 90 fitted into a slot 91 formed in an oscillatory bell-crank lever 92 fulcrumed on the stud 93 on the turret 38. Pivoted on the oscillating lever 92, as at 94, is a slide-block 95 entering a vertical slot 96 formed in the back plate 97 of a looper-actuating slide-member 98 adapted to track a guide-way 99 formed in a vertical plate-member 100 preferably fastened by screws 101 to the turret 38. Secured to the slide-member 98, as by screws 102, on the outside of the vertical plate-member 100, Fig. 5, is a right angle carrier or looper-supporting bracket 103, the screws 102 preferably serving to maintain the supporting bracket 103, the slide-member 98 and the back plate 97 in assembled face-to-face relation. Pivoted, as at 104, on the free end of the horizontal limb of the looper-supporting bracket 103 is one of a pair of interconnected toggle-links 105, 106; the two links being substantially longitudinally alined and hinged together by a screw 107 which serves as a knuckle-pin for the two toggle-links. The link 106 is fitted with two depending rollers 108 which are adapted to track a cam-groove 109 milled in the upper face of a cam-plate 110 secured by screws 111 to the turret 38. The toggle-link 105 has cut into its upper face a transverse slot 112, Figs. 23 and 25, into which is inserted the shank 113 of the looper 37, the shank 113 having an elongated opening 114 for a clamp-screw 115 by which the looper 37 is mounted for limited adjustment to accommodate needles of various sizes. The looper 37 is formed with a loop-seizing beak 116 terminating in a throat 117 disposed to sufficiently expand the needle-thread-loop, as will be described later. Spaced below the beak 116 is a needle-guard 118 having a curved needle-contacting edge 119 which assists in properly locating the straight needle 14 during the actual seizing of the thread-loop by the beak of the looper. To minimize tilting of the looper 37 out of its horizontal plane of movement, the toggle-link 106 has fastened to it an inverted U-shaped guide 120 of which the limbs straddle the link 106 with the lower ends of the limbs positioned to slide on the upper face of the cam-plate 110, as shown in Fig. 3. It will be understood from the foregoing that the reciprocating actuating-rod 59 through the slide-block 90 carried by the offset head 70 and the slot 91, imparts an oscillatory movement to the bell-crank lever 92 about the stud 93, and that the oscillations of the bell-crank lever, through the slide-block 95 and slot 96, transmit to the looper-actuating slide-member 98 a variable reciprocating motion. The motions of the slide-member 98 are transmitted to the looper-carrying toggle-link 105, and the cam-groove 109 effects a making and breaking of the toggle-links 105 and 106 about the knuckle-pin 107, thereby to combine with the loop-seizing and loop-shedding movements of the looper lateral movements first to avoid collision with the curved needle 36 and second to carry the seized straight-needle thread-loop over the point of the curved needle so that the latter on its upstroke may enter the expanded straight-needle thread-loop.

To aid in describing a cycle of operations of the stitch-forming mechanism, attention is directed to Figs. 15 through 26, inclusive. Let it be understood that during the stitching the work W is securely held on the bed-plate of the machine by the usual work-clamp 51 and that the upper straight needle 14, carrying the upper thread $U^T$, penetrates the work W to form the depth-stitches which define the outside periphery or size of the eyelet; while the lower curved needle 36 carrying the lower thread $L^T$ reciprocates through the usual center eye 121 cut or punched into the work preferably before the stitching starts, thus laying its thread $L^T$ about the edge of the eye 121. With this in mind, assume now that the machine has produced several stitches and that the parts are in the position shown in Fig. 15, with the straight needle 14 at the top of its stroke and the curved needle 36 rising through the eye 121 in the work W after having entered the upper thread-loop $U^T$ presented by the looper 37. The curved needle 36, during its rise through the eye in the work W, is moving very rapidly since the actuating crank 66 is moving the toggle-links 63, 64 upwardly toward their straightened position. Meanwhile, the looper 37 is retracting and the straight needle 14 has a substantial dwell at the upper end of its stroke, since the needle-bar actuating crank 11 is passing through its highest point, as shown in Fig. 2. Proceeding with the cycle, the curved needle 36 continues in its rapid rise to the upper end of its stroke and the looper moves to its extreme retracted position just as the toggle-links 63, 64 reach their straightened position, but as the toggle-links move slightly past straightened position, as represented in full lines in Fig. 19, the actuating rod 59 receives a slight dip in its upper position which dip is communicated to the lower curved needle 36 to cause it to cast out a loop of its thread $L^T$ above the work W for entrance by the descending straight needle 14, as shown in Figs. 16 and 17; the looper 37 being given a corresponding idle movement adjacent its extreme retracted position. The straight needle 14, after entering the curved needle thread-loop $L^T$, penetrates the work W, Fig. 18, and continues in its descent to the bottom of its stroke, during which time the curved needle 36 rises again to the upper end of its stroke and then begins its descent back through the eye in the work. During the return stroke of the curved needle 36, the straight needle 14 begins to ascend, Figs. 20 and 21, and in so doing casts out a thread-loop which is seized by the beak 116 of the advancing looper 37. While the looper 37 is advancing from its fully retracted position to and slightly beyond loop-seizing position, the two rollers 108 carried by the link 106 are traveling in the straight portion of the cam-groove 109, and thus the looper 37 is caused to move in a straight line. After seizing the thread-loop presented by the straight needle 14, the looper continues in its movement to expand the seized thread-loop, as shown in Figs. 22 and 23. As the looper 37 approaches the curved needle 36, it is moved sidewise or laterally slightly to avoid striking the curved needle, the sidewise movement of the looper being effected by a buckling of the toggle-links 105, 106 (Fig. 23) resulting from the rollers 108 traversing the first curve in the cam-groove 109. Continued movement of the looper to its extreme advanced position, illustrated in Figs. 24 and 25, will cause a reverse buckling of the toggle-links 105, 106, which carries the beak 116 of the looper 37 in a curved path around the needle 36 to the position shown in Fig. 25. Thus, the looper 37 carries the straight-needle thread-loop $U^T$ directly over and above the point of the curved needle 36. During the travel of the looper 37 around the curved needle 36, the latter descends into its lowermost position where it undergoes substantially a dwell resulting from the crank 66, Fig. 26, moving through its lower dead center position. This so-called dwell of the curved needle 36 gives the looper ample time to move the straight needle thread-loop $U^T$ across the point of the curved needle 36 before the same begins to rise. The throat 117 on the looper 37 is formed and disposed relative to the looper-beak 116 so as to spread the two limbs of the straight needle thread-loop $U^T$, whereby entrance by the curved-needle point into the thread-loop is assured. The expanding of the straight-needle thread-loop $U^T$, the rise of the straight needle 14 to its highest position and the descent of the curved needle 36 to its lowest position all contribute to the setting of the previously formed stitch.

It will be understood that to form the stitches properly the curved needle 36 must descend to a position in which its point is below the expanded straight-needle thread-loop $U^T$, so that said curved needle on its ascent may enter the thread-loop $U^T$. This relation between the curved needle 36 and the looper 37 is shown in Fig. 24. It is also necessary for proper concatenation of the sewing threads for the curved needle 36 to rise sufficiently far at the upper end of its stroke as to present its thread $L^T$ for seizure by the descending straight needle 14. This relation between the straight needle and the curved needle is shown in Fig. 16. When changing the size of the eyelet, as by shifting the needle 14 sidewise relative to the axis of the needle-bar 13, the only element of the stitch-forming mechanism which is moved is the straight needle 14. It follows then that, if the change in the size of the eyelet is considerable, the stroke of the curved needle 36 must be correspondingly changed, and at the upper end of the stroke only, in order to maintain the proper relation with the straight needle 14, as shown in Fig. 16. When reducing the size of the eyelet, it is necessary to shorten the stroke of the curved needle 36 only when the length of thread $L^T$ pulled from the supply is in excess of that capable of being taken up or handled by the curved needle and the usual associated thread controls.

The eyelet produced by a machine fitted with the present improved stitch-forming mechanism is illustrated in Figs. 28 and 29; Fig. 28 showing the stitch-formation as it appears on the upper face of the work W, this being the same as in the regular eyelet, and Fig. 29 showing the stitch-formation as it appears on the lower face of the work W, this being different than the lower face of the regular eyelet. A detailed description of the eyelet will not be given herein, inasmuch as the eyelet per se forms the subject of patent application Serial No. 786,013, filed November 14, 1947, in the name of Darwin G. Smith. Suffice to say that the under face of the eyelet has, in effect, an embossed or padded appearance closely approximating that of a hand stitched eyelet, the embossed appearance resulting from the loop of upper thread $U^T$ passing over, then transversely under and back over the under thread $L^T$, as shown in Fig. 29. This particular concatenation of the two threads $U^T$ and $L^T$ is obtained by virtue of the fact that the looper 37 passes the curved needle 36 on that side which is adjacent the previous stitch in the work, which in the present case is the rear side of the curved needle, i. e. the side away from the direction of feed. As a result of this, the lead of the lower thread $L^T$ from the last stitch to the eye in the curved needle is over the loop of upper thread $U^T$ expanded by the looper 37, as shown in Fig. 30. In previous machines of the type disclosed in the Allen Patent No. 1,162,207, the looper passed the curved needle on the front side thereof, resulting in the lead of the lower thread $L^T$ being below the loop of upper thread $U^T$ expanded by the looper 37, as shown in Fig. 31.

From the above, it will be understood that the present looper mechanism provides a sturdy construction with good mechanical movements, the mechanism also being capable of convenient assembly and adjustment. Furthermore, the improved mechanism effects the production of an eyelet more nearly simulating a hand sewn eyelet, the stitches composing the eyelet having a novel concatenation which permits setting the stitch with greater ease. In addition the improved mechanism increases the range of the machine, permitting the production of various sizes of eyelets with a minimum of necessary adjustments.

It is evident that the looper mechanism herein shown and described, while designed particularly for embodiment in that class of eyelet or buttonhole machines in which the stitch-forming mechanism rotates, is not limited in its adaptation to any particular type of machine, it being essentially part of an overedge stitching mechanism which may be employed in a straight stitching machine of the overedge type.

Having thus set forth the nature of the invention, what we claim herein is:

1. A looper mechanism for a sewing machine having complemental upper and lower needles, comprising a bodily movable carrier, means for actuating said carrier, toggle-links anchored to said carrier for actuation thereby, a looper secured to one of said toggle-links and having a path of movement to seize a thread-loop from one of said needles and present it to the other of said needles, and means for controlling relative movement of said toggle-links during actuation of said carrier.

2. A looper mechanism for a sewing machine having complemental upper and lower needles, comprising a reciprocating carrier, means for imparting movements to said carrier, a pair of toggle-links anchored to said carrier for actuation thereby, a looper fastened to one of said toggle-links and adapted to seize a thread-loop from one of said needles and present it to the other of said needles, a cam-track disposed adjacent said toggle-links, and cam-follower means secured to one of said toggle-links and engaging said cam-track for controlling the toggle-links during the movement of said carrier.

3. A looper mechanism for a sewing machine having complemental upper and lower needles, comprising a movable carrier, means for imparting motion to said carrier, a pair of toggle-links pivoted at one end to said carrier, a looper supported by one of said toggle-links and adapted to seize a thread-loop presented by one of said needles and carry said thread-loop into position to be entered by the other of said needles, a cam-track disposed below said toggle-links, and a plurality of rollers depending from one of said toggle-links and extending into engagement with said cam-track for controlling the toggle-links during the movements of said carrier.

4. A looper mechanism for a sewing machine having an upper needle turnable about an axis, a turret turnable about said axis, and a lower needle supported by said turret, comprising a reciprocatory carrier slidably supported on said turret, a pair of tandem arranged toggle-links pivoted at one end to said carrier, a looper secured to one of said toggle-links, a cam-track provided on said turret below said toggle-links, and a pair of rollers depending from one of said toggle-links and cooperating with said cam-track for imparting buckling movements to said toggle-links during reciprocation of said carrier.

5. A looper mechanism for a sewing machine having a turret, including an actuating rod, a lever pivoted to said turret, means operatively connecting said lever to said actuating rod, a carrier slidably mounted on said turret, means operatively connecting said carrier to said lever, interconnected toggle-links supported by said carrier, a looper secured to one of said toggle-links, and means for controlling the toggle-links during the sliding movement of said carrier.

6. A sewing machine having a reciprocatory upper needle, loop-taking means including a movable looper adapted to seize thread loops from the upper needle at one side of the work and a reciprocatory lower needle adapted to carry a thread-loop through the upper needle thread-loop and present it for entrance by the upper needle at the opposite side of the work, a movable carrier, means for imparting movements to said carrier, means movably supporting said looper on said carrier, and means for controlling said looper so that after seizing the upper needle thread-loop said looper travels in a path between the lower needle and the previous stitch in the work.

7. A sewing machine having a reciprocatory upper needle, loop-taking means cooperating with said needle in the formation of overedge stitches including a reciprocatory lower needle adapted to carry a thread-loop through the upper needle thread-loop and present it for entrance by the upper needle and an upper needle thread-loop seizing looper having a loop-expanding path of movement between the lower needle and the previous stitch in the work, and means for actuating said looper.

8. A sewing machine having a work-support, a reciprocatory upper needle, means for effecting a relative shift between said upper needle and the work, loop-taking means including a movable looper adapted to seize thread loops from the upper needle at one side of the work and a reciprocatory lower needle adapted to carry a thread-loop through the upper needle thread-loop and present it for entrance by the upper needle at the opposite side of the work, a movable carrier, means for imparting movements to said carrier, means movably supporting said looper on said carrier, and means constructed and arranged for controlling the movement of said looper so that after seizing the upper needle thread-loop said looper passes the lower needle on the rear side thereof with respect to the direction of relative lateral shift between said upper needle and the work.

9. A sewing machine having a reciprocatory needle-bar, a needle carried thereby, means for shifting said needle sidewise relative to the axis of said needle-bar, complemental loop-taking means including a movable looper and a vibratory loop-presenting implement cooperating with said looper and said needle, a carrier for said loop-presenting implement, a fulcrum about which said carrier pivots, an actuating rod, and means operatively connecting said rod to said carrier including a link connected at one end to said rod and a rock-arm connected to the other end of said link, and means connecting said rock-arm to said carrier for regulating the stroke of said loop-presenting implement.

10. A sewing machine having a reciprocatory needle-bar, a needle carried thereby, means for shifting said needle sidewise relative to the axis of said needle-bar, cooperating loop-taking means including a movable looper and a vibratory loop-presenting implement cooperating with said looper and said needle, a carrier for said loop-presenting implement, a fulcrum about which said carrier pivots, an actuating rod, and means operatively connecting said rod to said carrier including a link connected at one end to said rod and a rock-arm connected to the other end of said link, and means connecting said rock-arm to said carrier for regulating the stroke of said loop-presenting implement, said last-named means being constructed and arranged so that an adjustment of the rock-arm relative to the carrier will shift the pivotal connection between the link and rock-arm in a direction substantially normal to a line drawn between the pivotal connection of the rock-arm with the link and the pivotal connection of the other end of the link with said actuating rod.

11. A sewing machine having a reciprocatory needle-bar, a needle carried thereby, means for shifting said needle sidewise relative to the axis of said needle-bar, cooperating loop-taking means including a movable looper and an oscillatory loop-presenting implement cooperating with said looper and said needle, a carrier for said loop-presenting implement, a fulcrum about which said carrier pivots, an actuating rod, and means operatively connecting said rod to said carrier including a link connected at one end to said rod, and a rock-arm connected to the other end of said link, said rock-arm having an elongated hole extending through it, and a screw projecting through said elongated hole and threaded into said carrier for clamping said rock-arm to said carrier.

12. A sewing machine having a reciprocatory needle-bar, a needle, means securing said needle to said needle-bar with capacity to shift said needle sidewise relative to said needle-bar, cooperating loop-taking means including a movable looper adapted to seize thread-loops from said needle at one side of the work and a vibratory loop-presenting implement adapted to carry a thread-loop through the needle thread-loop and present it for entrance by the needle at the opposite side of the work, means for actuating said looper and said loop-presenting implement, and means for varying the stroke of said loop-presenting implement to accommodate the different shifted positions of said needle.

13. A sewing machine having a reciprocatory needle-bar, a needle, adjustable means securing said needle to said needle-bar providing for both sidewise and endwise shifting movements of said needle relative to said needle-bar, cooperating loop-taking devices including a movable looper adapted to seize thread-loops from said needle at one side of the work and a vibratory loop-presenting implement adapted to carry a thread-loop through the needle thread-loop and present it for entrance by the needle at the opposite side of the work, means for imparting operative movements to said looper and said loop-presenting implement, and means for changing the stroke of said loop-presenting implement to accommodate different shifted positions of said needle.

14. A looper mechanism for a sewing machine having complemental upper and lower needles, comprising a slidable carrier, means for sliding said carrier, interconnected first and second toggle-links of which the first toggle-link has one end pivoted to said carrier, a looper mounted on said first toggle-link and adapted to seize a thread-loop from one of said needles and present it to the other of said needles, a cam-track disposed adjacent said toggle-links, and cam-follower means secured to the second of said toggle-links and engaging said cam-track for controlling the toggle-links during the sliding movement of said carrier.

DARWIN G. SMITH.
HAROLD C. FAULKNER.

REFERENCES CITED

The following references are of record in the file of this patent:

UNITED STATES PATENTS

| Number | Name | Date |
|---|---|---|
| 1,396,111 | Hill | Nov. 8, 1921 |